Dec. 16, 1924.

D. R. DAY

FERTILIZER DISTRIBUTOR

Filed Dec. 1, 1923

1,519,960

2 Sheets-Sheet 1

Inventor
D. R. Day
By Jerry A Mathews
Attorney

Dec. 16, 1924.　　　　　　　　　　　　　　　　　　1,519,960
D. R. DAY
FERTILIZER DISTRIBUTOR
Filed Dec. 1, 1923　　　　　　2 Sheets-Sheet 2
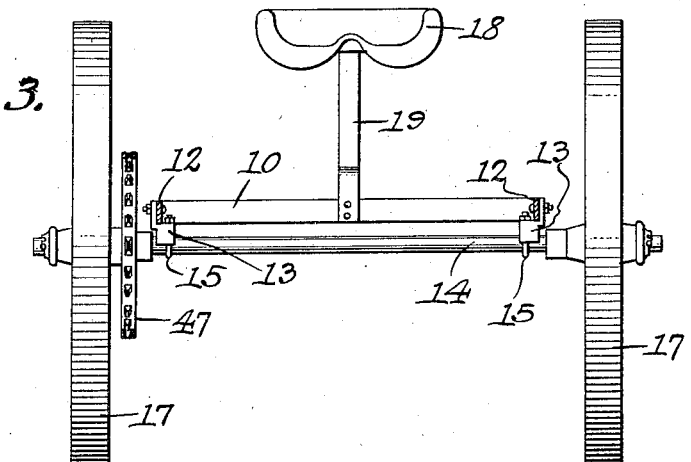
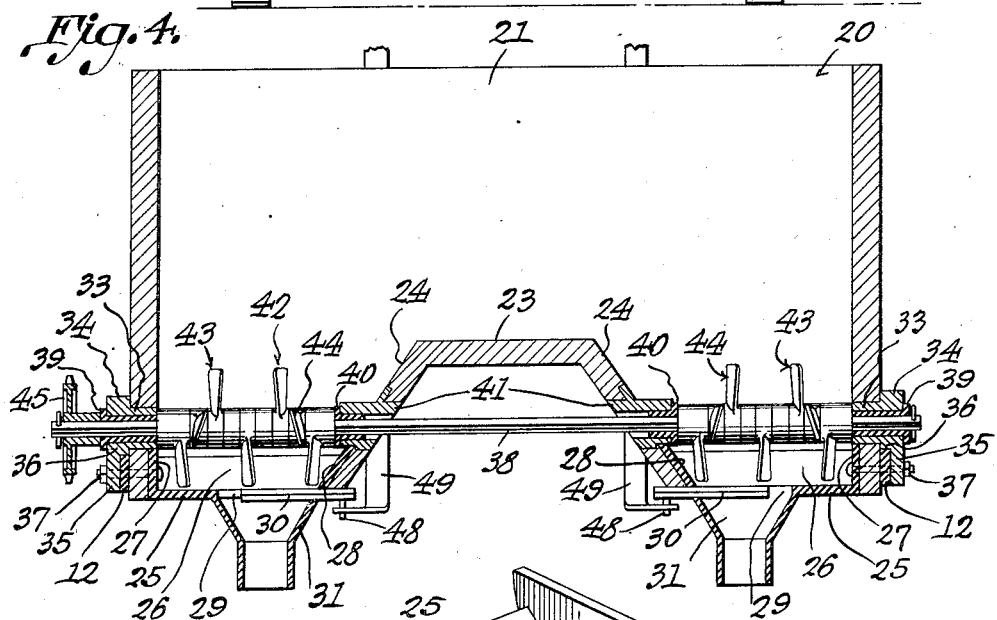
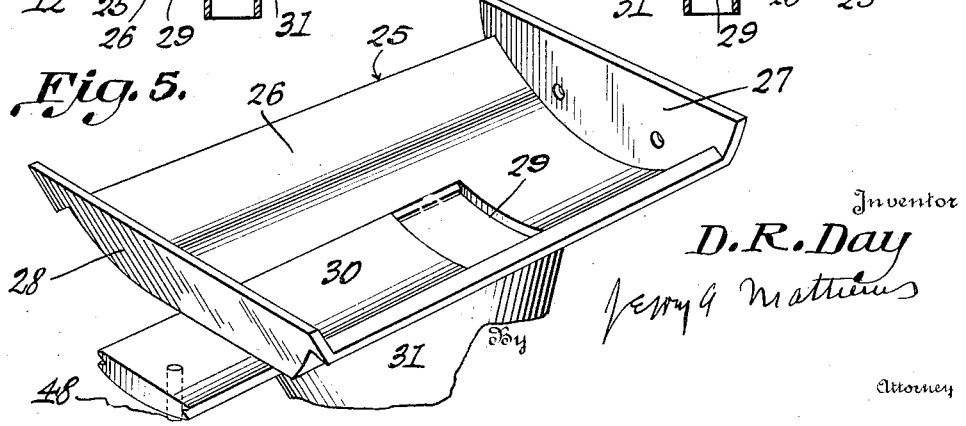
Inventor
D. R. Day
Jerry G Mathews
By
Attorney

Patented Dec. 16, 1924.

1,519,960

UNITED STATES PATENT OFFICE.

DANIEL R. DAY, OF TRENTON, SOUTH CAROLINA.

FERTILIZER DISTRIBUTOR.

Application filed December 1, 1923. Serial No. 678,042.

*To all whom it may concern:*

Be it known that I, DANIEL R. DAY, a citizen of the United States, residing at Trenton, in the county of Edgefield and State of South Carolina, have invented certain new and useful Improvements in Fertilizer Distributors, of which the following is a specification.

My invention relates to improvements in fertilizer distributors.

An important object of the invention is to provide a strong construction of bottom for the hopper, which is bolted with the hopper to the frame of the machine, providing a highly durable device.

Other objects and advantages of the invention will be apparent during the course of the following description.

Figure 1:
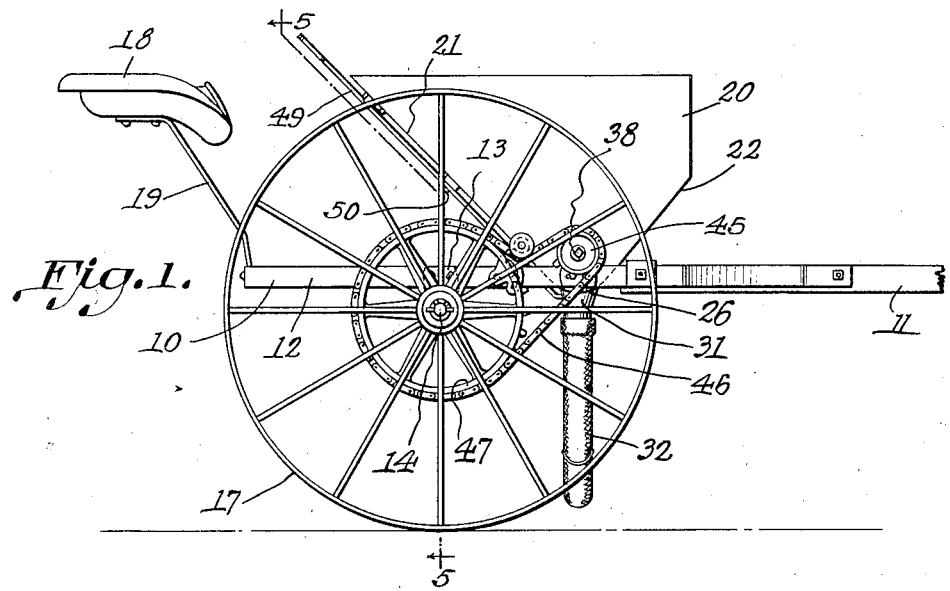
Figure 2:
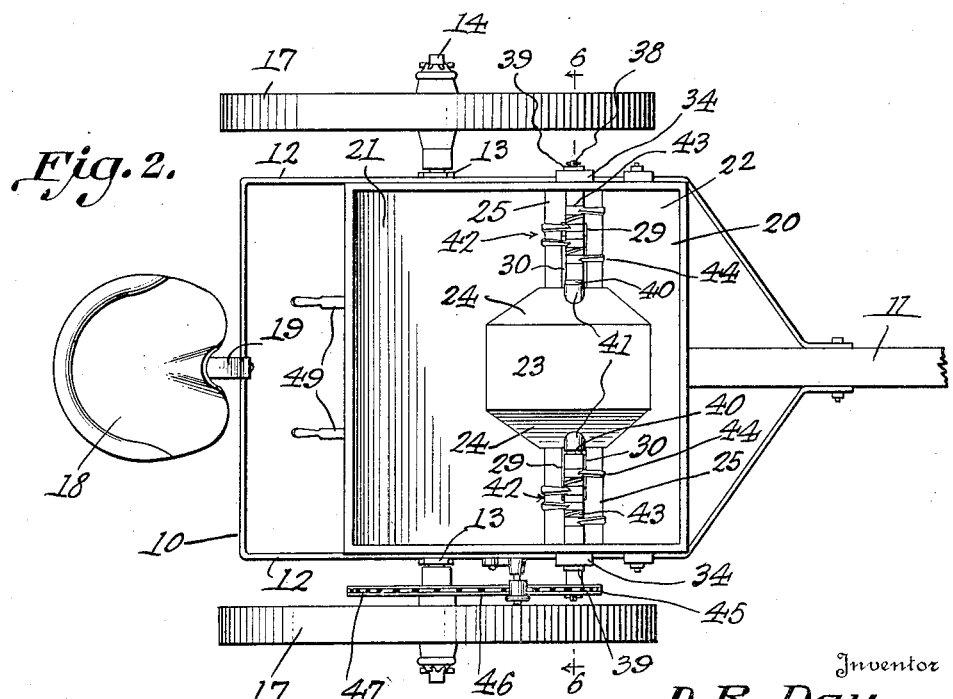

In the accompanying drawings forming a part of this specification, and in which like numerals are employed to designate like parts throughout the same, Figure 1 is a side elevation of a fertilizer distributor embodying my invention, Figure 2 is a plan view of the same, Figure 3 is a transverse section taken on line 5—5 of Figure 1, parts being omitted, Figure 4 is a transverse vertical section through the hopper taken on line 6—6 of Figure 2, and, Figure 5 is a perspective view of the casting or bottom of the hopper.

In the drawings, wherein for the purpose of illustration is shown a preferred embodiment of my invention, the numeral 10 designates a main frame, which is preferably rectangular, and having suitable connection at its forward end with a tongue 11 or other draft appliance. This frame 10 embodies side rails 12, and these side rails have brackets or bearings 13, Figure 3, bolted thereto. These brackets or bearings engage an axle 14 arranged therebeneath with U-bolts 15 serving to rigidly hold the axle within the curved recesses of the bearings. The axle 14 is stationary, as above stated, and carries wheels 17, rotatable therein.

The numeral 18 designates a driver's seat mounted upon a spring 19, attached to the rear end of the frame 10.

The numeral 20 designates a hopper, extending transversely of the frame 10, and near its forward end. This hopper embodies a rear inclined wall 21 and a forward inclined wall 22, which converge downwardly. These walls intersect with a horizontal bridge or deflector 23, having outwardly inclined walls 24, at its ends, as shown.

The walls 24 and associated walls form lower hopper chambers or pockets, having bottoms 25. These bottoms are preferably castings. Each bottom embodies a transversely curved bottom element 26, provided at its ends with upstanding flanges 27 and 28. The curved bottom 26 has a longitudinal discharge opening 29, adapted to be covered and uncovered by a sliding valve 30. The opening 29 discharges into a tapered coupling 31, preferably integral with the bottom 26. The couplings 31 have connection with discharge chutes 32, as shown.

The numeral 33 designates outer tubular bearings, inserted within openings formed in the side walls of the hopper 20, and these tubular bearings are formed integral with outer enlarged portions 34, carrying depending plates or portions 35, having horizontal shoulders 36. As clearly shown in Figure 4, when the hopper is mounted upon a frame 10, the side walls of the hopper fit closely within the side rails 12 while the plates 35 engage upon the outer sides of the rails 12, with the shoulders 36 engaging the upper edges of these rails. The bottom or casting 25 is mounted within the hopper chamber or pocket with the substantially vertical flange 27 engaging the inner face of the outer wall of the hopper and the inclined flange 28 engaging the inner face of the inclined wall 24. A pair of bolts 37 pass through the plate 35, rail 12, side wall of the hopper and flange 27, and serve to positively clamp all of these parts together. This affords a very strong and rigid construction.

The numeral 38 designates a transverse agitator shaft, preferably square in cross section and receiving upon its outer ends bearings or bushings 39, which are rotatable within the tubular bearings 33. Inner bearings or bushings 40 are carried by the shaft 38 and are rotatable within tubular bearings 41, mounted upon the inclined walls 24.

Operating within each hopper compartment or chamber near and above the bottom 26 is agitating means 42, comprising an outer set of agitators or agitator blades 43, preferably five in number, which are pitched to throw the fertilizer inwardly toward the inclined wall 24, and an inner set of agitators or agitator blades 44, preferably four in number which are pitched to throw the fertilizer outwardly from the inclined wall 24. In other words, these two sets of blades are pitched to throw the fertilizer toward the center of the hopper chamber, in oppositely traveling streams, thus effecting the maximum agitation.

A sprocket wheel 45 is mounted upon the outer end of the shaft 38, for turning it, and this sprocket wheel is engaged by a sprocket chain 46 extending rearwardly for engagement with a sprocket wheel 47. This sprocket wheel is rigidly mounted upon one of the wheels 17 for rotation therewith.

Each sliding valve or closure 30 is pivotally connected at 48, with a lever 49, pivoted at 50, and this lever may have suitable latch means to lock it in the selected adjusted position.

The operation of the machine is as follows:

The fertilizer is placed within the hopper 20, and is conducted by the bridge or wall 23 into the lower chambers or pockets, in the presence of the revolving agitating means. The agitating means is such that a part of the fertilizer is moved inwardly and a part outwardly, in a substantially horizontal direction, and these two oppositely traveling streams of fertilizer cause the same to be thoroughly agitated or finely divided, whereby the same is properly fed into the chute or tube 32.

It is to be understood that the form of my invention herewith shown and described, is to be taken as a preferred example of the same, and that various changes in the shape, size, and arrangement of parts may be resorted to, without departing from the spirit of my invention, or the scope of the subjoined claims.

Having thus described my invention, I claim:

1. In a fertilizer distributor, a frame, a hopper arranged within the frame and extending transversely thereof, said hopper having a central upstanding bridge embodying downwardly and outwardly inclined walls, said bridge dividing the hopper into a pair of chambers, a pair of bottom elements mounted within the chambers, said bottom elements having inner inclined flanges contacting with said inclined walls of the bridge and outer substantially vertical flanges engaging the side walls of the hopper, bolts connecting the vertical flanges and the side walls of the hopper with the frame, rotatable elements mounted within said chambers, and outlet elements connected with the bottom elements.

2. In a fertilizer distributor, a frame embodying side railings, a hopper extending transversely within the frame and having its sides disposed in close relation to the side railings, said hopper having a central arranged upstanding bridge embodying downwardly and outwardly inclined walls said bridge serving to divide the hopper into a pair of chambers, said inclined walls and the side walls of the hopper having openings, inner bearings mounted within the openings in the inclined walls, outer bearings mounted within the openings in the side walls of the hopper and extending outwardly therebeyond and engaging with the upper edges of the side rails, said outer bearings having depending plates integral therewith and engaging the outer sides of said side rails, bottom elements arranged within the chambers and having inner inclined flanges to engage the inclined walls of the bridge and outer vertical flanges to engage with the side walls of the hopper, bolts passing through the depending plates, side rails, sides of the hopper and outer vertical flanges and rigidly connecting them, a shaft rotatable within said bearings, elements driven by the shaft, and means to drive the shaft.

In testimony whereof I affix my signature.

DANIEL R. DAY.